No. 860,942. PATENTED JULY 23, 1907.
A. SCHWARTZ.
APPARATUS FOR UNLOADING VESSELS.
APPLICATION FILED MAR. 8, 1907.
2 SHEETS—SHEET 1.
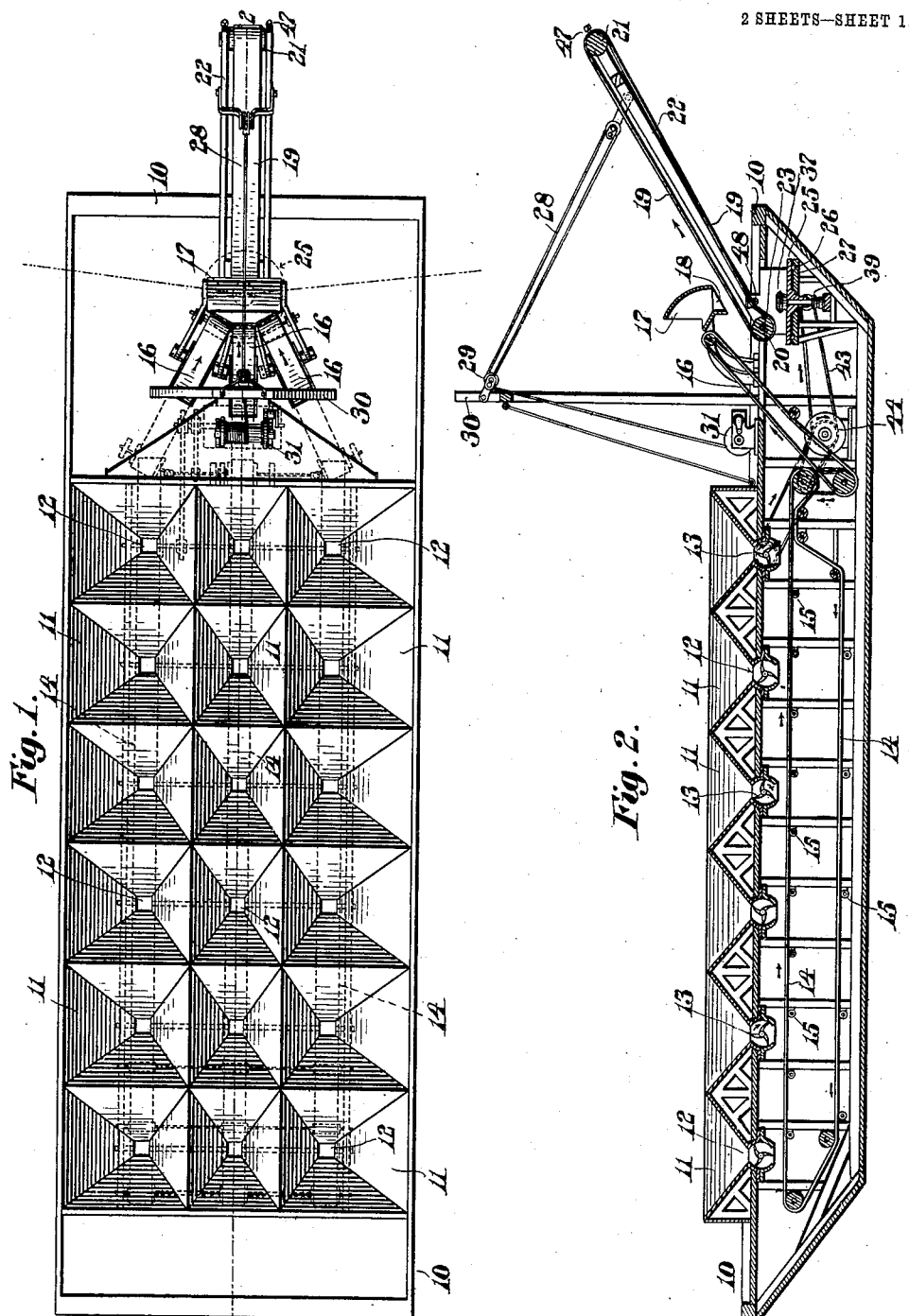
Witnesses:
Howard Hanscom
Poswell F. Hatch
Inventor:
Aaron Schwartz,
by Walter E. Lombard,
Atty.

No. 860,942. PATENTED JULY 23, 1907.
A. SCHWARTZ.
APPARATUS FOR UNLOADING VESSELS.
APPLICATION FILED MAR. 8, 1907.
2 SHEETS—SHEET 2.
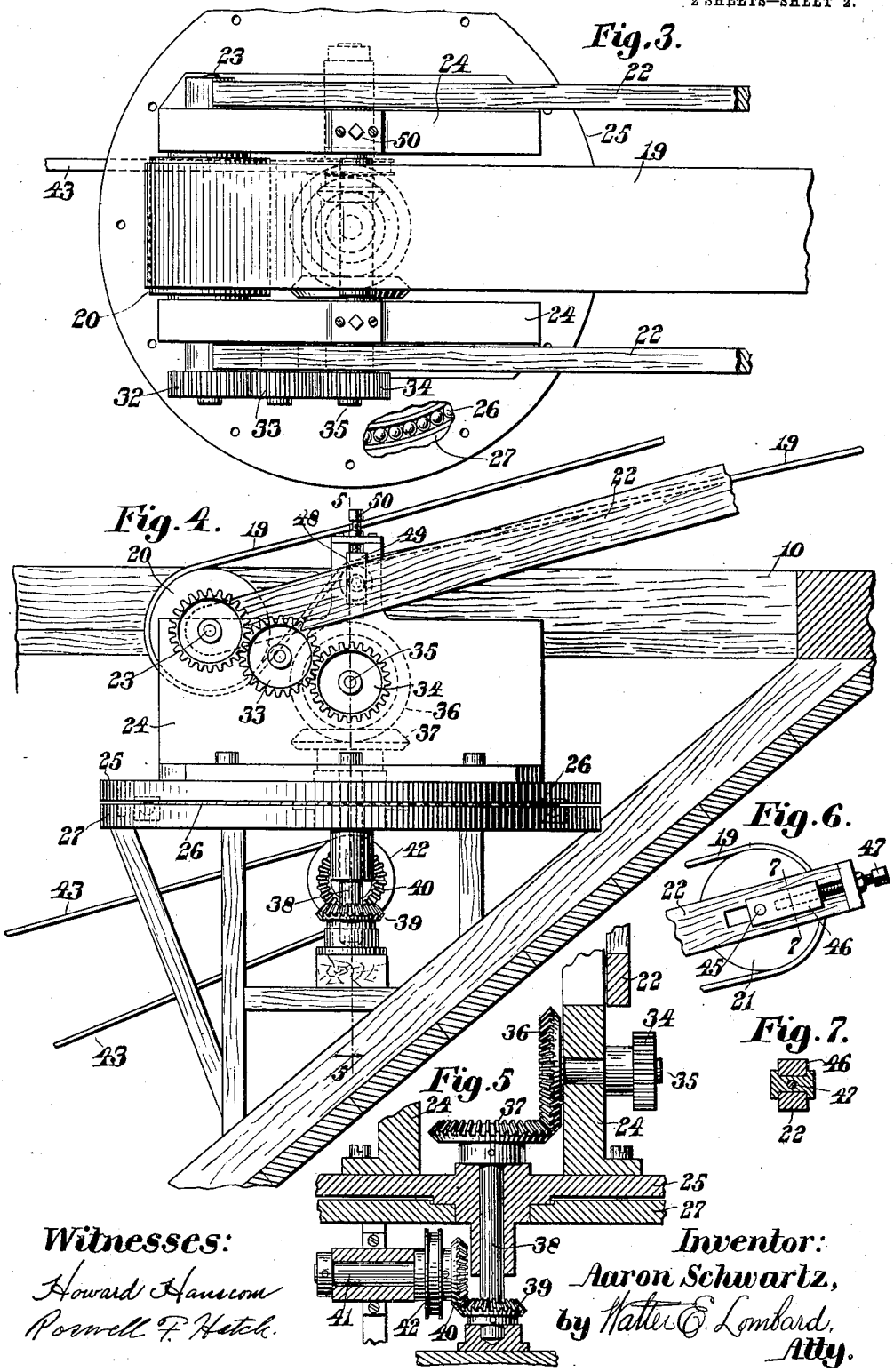
Witnesses:
Howard Hanson
Powell F. Hatch
Inventor:
Aaron Schwartz,
by Walter E. Lombard,
Atty.

UNITED STATES PATENT OFFICE.

AARON SCHWARTZ, OF BOSTON, MASSACHUSETTS, ASSIGNOR TO AUTOMATIC RAPID UNLOADING COMPANY, OF BOSTON, MASSACHUSETTS, A CORPORATION OF MASSACHUSETTS.

APPARATUS FOR UNLOADING VESSELS.

No. 860,942.     Specification of Letters Patent.     Patented July 23, 1907.

Application filed March 8, 1907. Serial No. 361,243.

*To all whom it may concern:*

Be it known that I, AARON SCHWARTZ, a citizen of the United States of America, and a resident of Boston, in the county of Suffolk and State of Massachusetts, have invented certain new and useful Improvements in Apparatus for Unloading Vessels, of which the following is a specification.

This invention relates to movable carriers for sand, coal, and similar material and especially to such carriers as barges, scows, etc.

The special object of the present invention is to provide a ready means of rapidly unloading the material from the barge or scow, dispensing as far as possible with manual labor and the laborious lifting usually attending the unloading.

The invention consists in providing a carrier with a plurality of bins having valved openings at the bottom through which the material in each row of bins may be discharged upon a movable conveyer, the various conveyers converging at a desired point and delivering the material thereon to a single conveyer mounted upon a boom adapted to extend beyond the limits of the carrier at any desired angle.

The invention further consists of certain novel features of construction and arrangement of parts which will be readily understood by reference to the description of the drawings and to the claims hereinafter given.

Of the drawings: Figure 1 represents a plan of a barge embodying the features of this invention. Fig. 2 represents a vertical section of the same on line 2—2 on Fig. 1. Fig. 3 represents a plan of the turn-table upon which the boom and discharge belt conveyer is mounted. Fig. 4 represents an elevation of the same. Fig. 5 represents a section on line 5—5 on Fig. 4, looking in the direction of the arrow. Fig. 6 represents an elevation of the end of the boom, and Fig. 7 represents a transverse section on line 7—7 on Fig. 6.

Similar characters designate like parts throughout the several figures of the drawings.

In the drawings, 10 represents a barge of any well-known construction provided with a plurality of bins 11, the walls of which are inclined and converge at a discharge outlet 12. This outlet 12 is closed by means of any suitable valve 13 shown in the present application as a revoluble bladed member driven in any suitable manner when it is desired to discharge the material from the bins 11 and which is adapted to close the outlet 12 when at rest.

When the bladed members 13 are revolved to permit the material in the bins 11 to pass through the outlet 12 this material will fall upon an endless belt conveyer 14 mounted upon suitable rollers 15. In the preferred construction the barge is provided with several rows of bins extending longitudinally of the barge, the discharge outlets 12 therefrom being in parallel lines and each row of bins discharging upon a separate belt conveyer 14. Each of the belt conveyers 14 delivers the material thereon to an inclined belt conveyer 16. The outer ends of these conveyers 16 converge and deliver the material therefrom into a hopper 17 provided with an outlet 18 delivering the material passing therethrough to an endless belt conveyer 19 mounted upon suitable drums 20 and 21 revoluble in suitable bearings on a boom 22. This boom 22 is pivotally mounted upon the shaft 23 having bearings in the vertical plates 24 secured to the circular plate 25 mounted upon a plurality of balls or other friction members 26. The anti-friction members 26 move in any suitable path provided for them in a stationary plate 27 and the circular plate 25 may be readily moved upon said anti-friction members about its axis to move the boom 22 to any desired horizontal angle.

The boom 22 may be elevated to any desired vertical angle by means of the rope 28 passing over a pulley 29 secured to a frame 30 and operated by means of a windlass 31 of any well-known construction. The drum 20 for driving the belt conveyer 19 is itself driven by means of the gear 32 meshing with an intermediate gear 33 which in turn meshes with a gear 34 mounted upon the end of a shaft 35, the other end of which has secured thereto a bevel gear 36. This gear 36 meshes with a similar bevel gear 37 mounted upon the upper end of a vertical shaft 38 extending through the center of the revoluble plate 25 and having secured to its opposite end a gear 39 which is driven by a gear 40 on a shaft 41. This shaft 41 has mounted thereon a pulley 42 which is driven by a belt 43 from any suitable motor 44. This motor 44 also is connected to the other belt conveyers 14 and 16 to move them when it is desired to unload the barge. The drum 21 at the outer end of the boom 22 is mounted upon a shaft 45 having a bearing in a box 46 which is adjustable lengthwise of said boom by means of the screws 47 for the purpose of taking up the slack in the belt conveyer 19 all in an obvious manner. An additional means for taking up the slack in the belt conveyer 19 is provided by means of a roller 48 mounted in bearings in the boxes 49 adjustable by means of the screws 50 in slots in the vertical plates 24. This roller bears against the under side of the belt conveyer 19 and by adjusting the box 49 the belt may be operated upon to wrap it more firmly around the drum 20 in order to drive the conveyer belt 19 thereby to better advantage.

In the operation of the invention the bins 11 are filled with sand, coal, or similar material. The barge is then towed to any desired point where it is desired to discharge the load. The boom 22 is then adjusted to the proper angle of elevation and to the proper horizontal angle to discharge the load at the particular point selected, the movement of the boom in a horizontal direction being accomplished by means of the turn-table 25—27 while the angle of elevation of said boom is changed by means of the windlass 31. When this has been accomplished the motor 44 is set in motion and all of the conveyer belts 14, 16, and 19 are operated thereby while at the same time the bladed valve members 13 are revolved and the sand or other contents of the bins is permitted to pass through the outlet 12 up onto the conveyer 14 on which it is carried in the direction of the arrows on said belts and delivered onto the inclined belt 16 which throws the material into the hopper 17 from which it passes on to the conveyer belt 19 which finally discharges it beyond the limits of the carrier onto a wharf or any other selected point. This provides a ready means of handling loads of this kind, insuring a very rapid unloading without manual labor, the whole load being automatically discharged by means of the motor 44 which may be of any well-known construction. The details of construction of the various elements may be varied to suit various conditions without affecting the principles of this invention.

It is believed that from the foregoing description the operation of the invention and the many advantages of a construction of this class will be fully apparent.

Having thus described my invention, I claim:

1. In a movable carrier for sand, coal, and similar material, the combination with a plurality of alined bins each having a delivery outlet; of means for simultaneously closing and regulating the discharge through said outlets; a continuous conveyer beneath said outlets adapted to receive the output from said bins; and means for operating said conveyers simultaneously with the opening of said outlets.

2. In a movable carrier for sand, coal, and similar material, the combination with a plurality of rows of bins each having a delivery outlet; of means for simultaneously closing and regulating the discharge through said outlets; a continuous conveyer beneath each row of outlets adapted to receive the output from said bins; and means for operating said conveyers simultaneously with the opening of said outlets.

3. In a movable carrier for sand, coal, and similar material, the combination with a plurality of bins each having inclined walls converging at a delivery outlet and extending to the top of said bins; of means for simultaneously closing and regulating the discharge through said outlets; a continuous conveyer beneath said outlets adapted to receive the output from said bins; and means for operating said conveyers simultaneously with the opening of said outlets.

4. In a movable carrier for sand, coal, and similar materials, the combination with a plurality of rows of bins each having inclined walls converging at a delivery outlet; of means for simultaneously closing and regulating the discharge through said outlets; a conveyer beneath each row of outlets adapted to receive the output from said bins; and means for operating said conveyers simultaneously with the opening of said outlets.

5. In a movable carrier for sand, coal, and similar material, the combination with a plurality of rows of bins each having a delivery outlet; of means for simultaneously closing and regulating the discharge through said outlets; a continuous conveyer beneath each row of outlets adapted to receive the output from said bins; and belt conveyers for concentrating the material on each of said conveyers upon a single discharging belt.

6. In a movable carrier for sand, coal, and similar material, the combination with a plurality of rows of bins each having a delivery outlet; of means for closing and regulating the discharge through said outlets; a conveyer beneath each row of outlets adapted to receive the output from said bins; belt conveyers for concentrating the material on each of said conveyers upon a single discharging belt; and means for driving said discharging belt.

7. In a movable carrier for sand, coal, and similar material, the combination with a plurality of rows of bins each having a delivery outlet; of means for closing and regulating the discharge through said outlets; a conveyer beneath each row of outlets adapted to receive the output from said bins; belt conveyers for concentrating the material on each of said conveyers upon a single discharging belt adapted to extend beyond the limits of said carrier; and means for driving said discharging belt.

8. In a movable carrier for sand, coal, and similar material, the combination with a plurality of belt conveyers; of a hopper adapted to receive the material therefrom provided with a single discharge outlet; a belt conveyer beneath said outlet and adapted to receive the output from said hopper and a conveyer for each of said plurality of belt conveyers adapted to receive the material thereon and deposit it in said hopper.

9. In a movable carrier for sand, coal, and similar material, the combination with a plurality of rows of bins each having a delivery outlet; of means for closing and regulating the discharge through said outlets; a conveyer beneath each row of outlets adapted to receive the output from said bins; upwardly inclined belt conveyers for concentrating the material on each of said conveyers upon a single discharging belt; and means for driving said discharging belt.

10. In a movable carrier for sand, coal, and similar material, the combination with a plurality of belt conveyers; of a hopper adapted to receive the material therefrom provided with a single discharge outlet; a belt conveyer beneath said outlet and adapted to receive the output from said hopper; and an upwardly inclined conveyer for each of said plurality of belt conveyers adapted to receive the material thereon and deposit it in said hopper.

11. In a movable carrier for sand, coal, and similar material, the combination with a hopper having a discharge outlet; of a plurality of means for delivering material to said hopper from different points; a turntable beneath said outlet and in axial line therewith; a conveyer thereon adapted to receive the discharge from said outlets; a driving drum on said turn-table adapted to drive said conveyer; means for revolving said drum; and means for moving said turntable about its axis.

12. In a movable carrier for sand, coal, and similar material, the combination with a hopper having a discharge outlet; of means for delivering material to said hopper; a fixed plate beneath said hopper; a movable plate rotatably mounted thereon; a boom pivoted to said movable plate; a revoluble shaft extending through said plates and forming a pivot for the movable plate; means for revolving said shaft; a gear secured to the upper end of said shaft; a belt conveyer mounted on said boom; a drum for driving the same; and mechanism interposed between said drum and gear for driving said drum.

Signed by me at Boston, Mass., this 7th day of March, 1907.

AARON SCHWARTZ.

Witnesses:
WALTER E. LOMBARD,
EDNA C. CLEVELAND.